United States Patent [19]
Bryant

[11] 4,014,410
[45] Mar. 29, 1977

[54] DISC BRAKE WITH FLUID COOLED ACTUATOR

[76] Inventor: Clyde C. Bryant, 1920 Forrest Ave., East Point, Ga. 30344

[22] Filed: Sept. 26, 1975

[21] Appl. No.: 617,151

Related U.S. Application Data

[63] Continuation-in-part of Ser. Nos. 361,633, May 18, 1973, abandoned, Ser. No. 416,010, Nov. 15, 1973, Pat. No. 3,918,558, and Ser. No. 503,151, Sept. 4, 1974, Pat. No. 3,983,966.

[52] U.S. Cl. ............ 188/71.6; 188/264 P; 188/264 F; 188/294; 192/70.12; 192/113 B
[51] Int. Cl.² ................ F16D 65/84
[58] Field of Search ...... 188/71.6, 264 P, 264 F, 188/294; 192/113 B, 70.12

[56] References Cited
UNITED STATES PATENTS

| | | | |
|---|---|---|---|
| 2,742,982 | 4/1956 | Helmbold | 188/264 F |
| 2,788,870 | 4/1957 | Heck | 188/264 P |
| 2,821,273 | 1/1958 | Sanford et al. | 188/264 F |
| 2,880,823 | 4/1959 | Sedergren | 188/264 F |
| 3,420,342 | 1/1969 | Botterill | 188/264 F |
| 3,584,708 | 6/1971 | Heck | 192/113 B X |

FOREIGN PATENTS OR APPLICATIONS

| | | | |
|---|---|---|---|
| 775,052 | 5/1957 | United Kingdom | 188/264 F |

*Primary Examiner*—George E. A. Halvosa
*Attorney, Agent, or Firm*—Gipple & Hale

[57] ABSTRACT

A brake system which utilizes a disc movably mounted on a rotating member such as a shaft, wheel hub or an axle, so that the disc may be tilted at an obtuse angle to the rotating member. A caliper forming two or more hydraulic cylinders and holding associated pistons is mounted adjacent the disc with the ends of the pistons being positioned on opposite sides of the disc. Friction pads are secured to the ends of the pistons. A master cylinder communicates with the caliper held cylinders through a fluid circuit. The fluid circuit includes a direct line leading to the master cylinder, a by-pass line leading to the master cylinder and a line leading from the cylinders of one side to the cylinders of the other side. A one way check valve is positioned in the direct line leading to the master cylinder and a shut-off valve is positioned in the by-pass line. The friction pads frictionally engage the disc in the first mode when the master cylinder is activated and in the second mode, the disc is tilted with the resultant conversion of the motion from rotating to reciprocal so that the brake pistons reciprocatively pump fluid through the by-pass line with its shut-off valve. For complete braking of the second mode the shut-off valve is closed to increase the pressure as the rotating member slows and to hold the pistons and the reciprocating disc in a fixed position thus stopping the rotating member from rotating.

3 Claims, 13 Drawing Figures

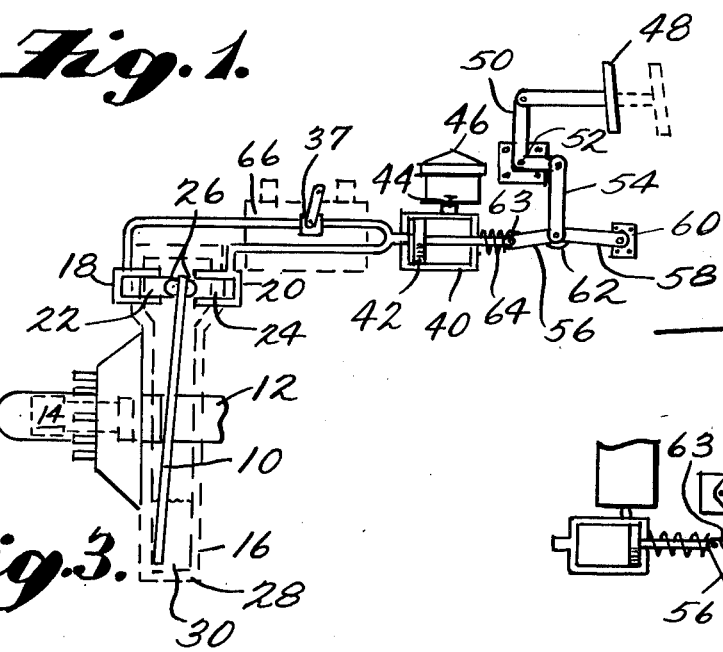
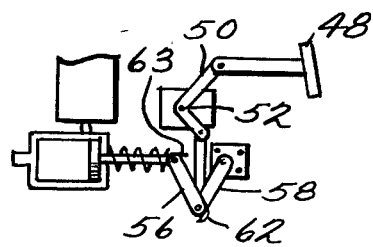
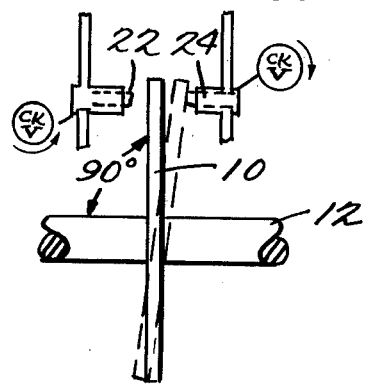
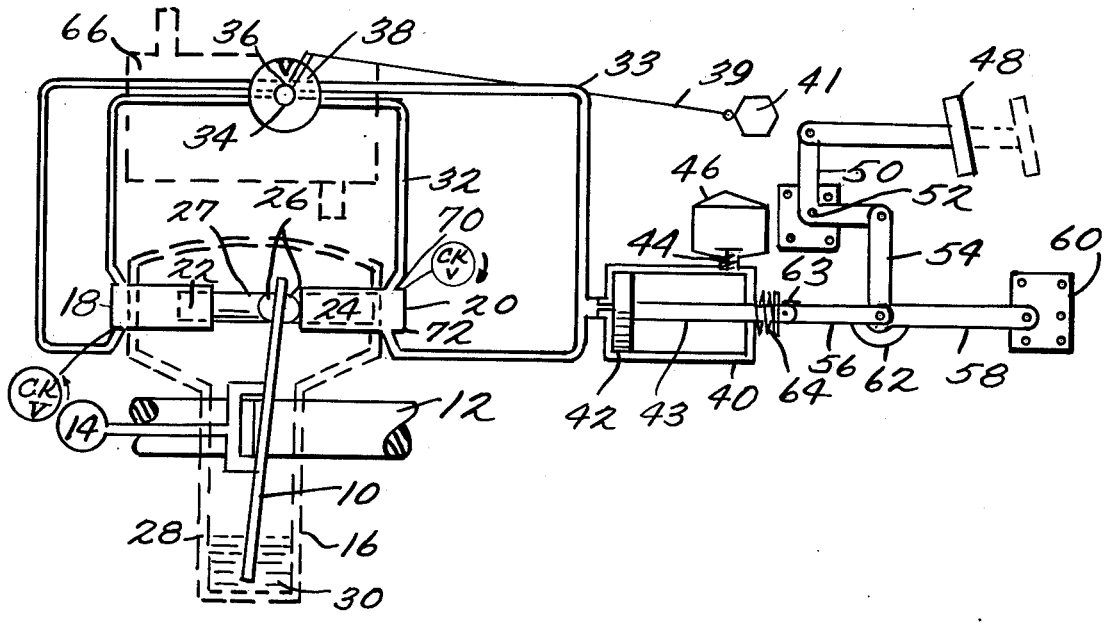

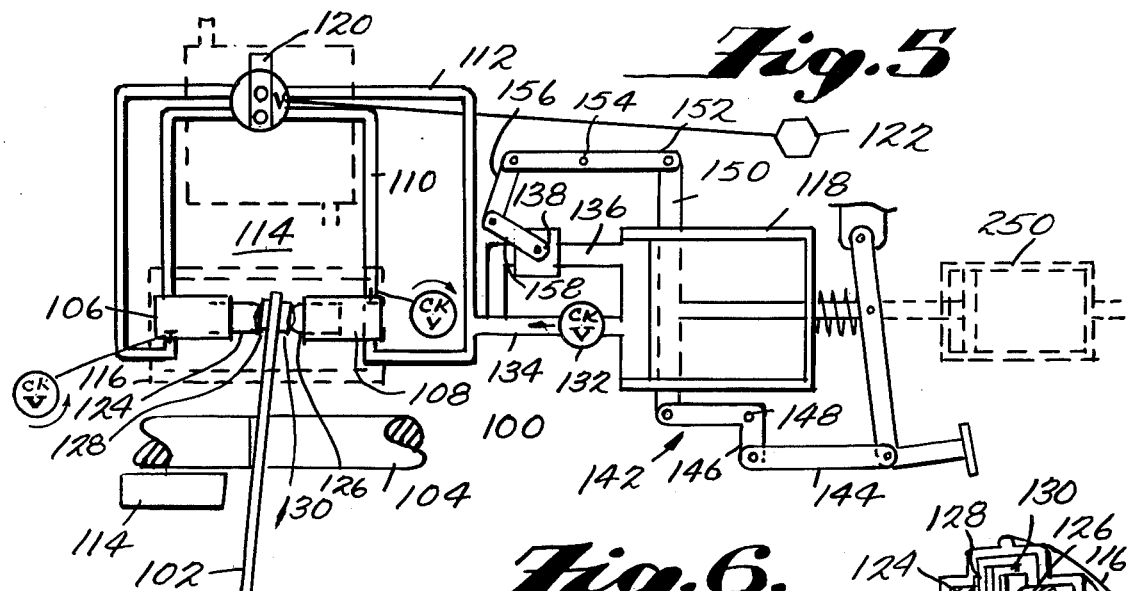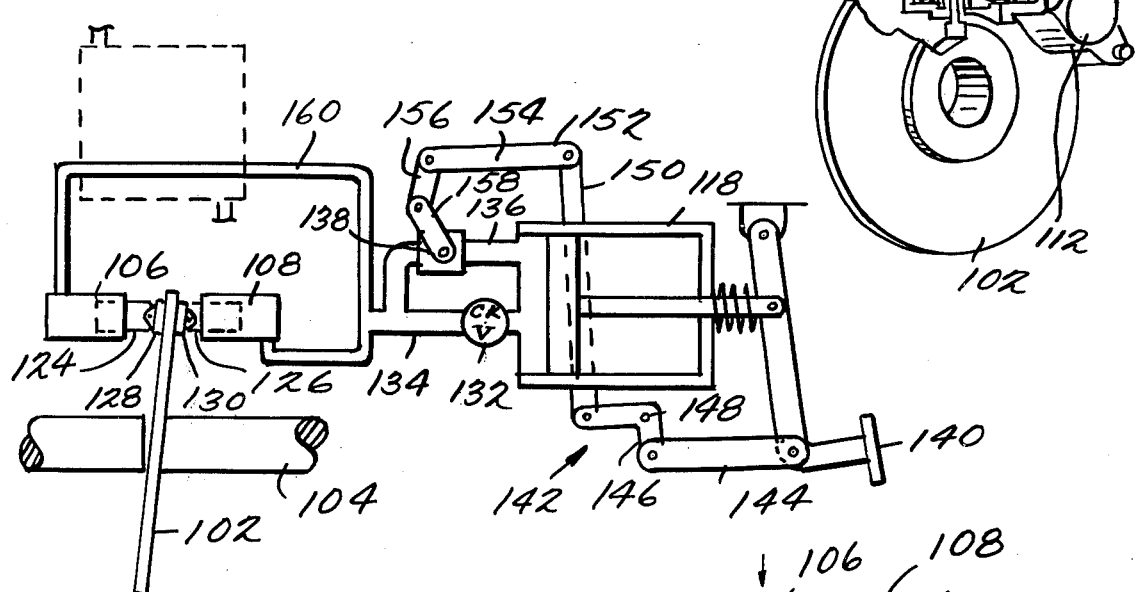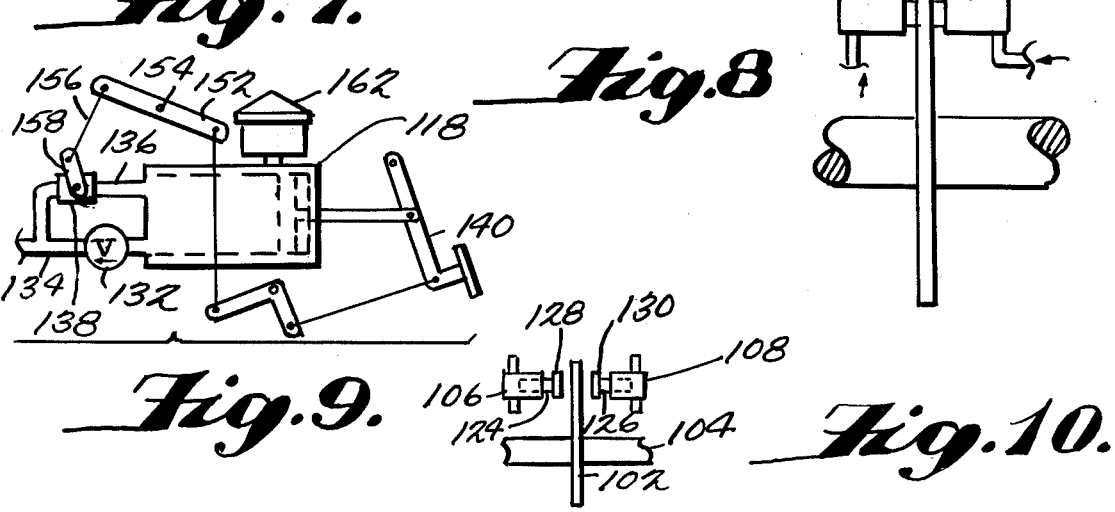

DISC BRAKE WITH FLUID COOLED ACTUATOR

This application is a continuation-in-part of U.S. patent application Ser. Nos. 361,633 filed May 18, 1973, now abandoned, Ser. No. 416,010 filed Nov. 15, 1973, now patent no. 3,918,558, and 503,151 filed Sept. 4, 1974, now Pat. No. 3,983,966, on similar subject matter by the same inventor.

BACKGROUND OF INVENTION

Description of Prior Art

In the past, railway vehicles, planes, trucks, buses and other mechanisms have been stopped by several kinds of brakes.

In 1827 John B. Jervis invented and installed on a train a large windmill like mechanism geared to the axles which held a train brake when descending mountain grades.

From the time that the first train began to roll until 1868 various mechanisms were used to brake trains, none of which were effective.

In 1868 the first Westinghouse brake was devised in which a steam-actuated pump on a locomotive rammed compressed air into a large reservoir. When a valve in the cab was opened, part of the supply rushed back through pipes and hoses to a cylinder under each car driving a piston connected by rods and levers to the brakes, causing their "shoes" to press against the tires on the wheels.

However, this "straight air brake" had three faults; first if there was a rupture in the system it would not work at all, second when cars became uncoupled on upgrades, only manual braking could keep them from rolling backward and finally, compressed air was slow in reaching the rear cylnders of a long train.

Westinghouse solved two of these problems in 1871, when an "automatic air brake" was brought out which failed safe. The pump and main reservoir were unchanged, but each car carried a small auxiliary tank and a mechanism called a "triple valve" which opened and closed passages by allowing one pressure to overcome another.

Under normal running conditions all of the reservoirs, together with the pipes and hoses, which collectively formed a continuous system called the train line, were fully charged, by the triple valves kept air out of the brake cylinders. For decelerations and full tops the engineer opened the control valve in the cab, letting some of the air in the train line escape to the atmosphere. The triple valve responded to lessened pressure by permitting the more highly compressed air in the small tanks to flow to the brake cylinders, where it exerted a force equal to the reduction in the line. The brakes were released by closing the main valve again, giving the pump a chance to recharge the system while at the same time the triple valves shut off the passages to the cylinders and voided the air within them.

Smooth braking was insured by providing graduated escape ports in the control valve, each hole allowing a 15 percent reduction. Only in emergencies was the handle swept with a single motion through its arc, uncovering all of the openings at once. This drastic action was variously known as "dynamiting her," "dumping the air," or "big-holding the Westinghouse." A parted or blown-out hose produced the same effect, applying the full force to the wheels.

Other braking systems used at this time were the so-called "independent systems" which used momentum as a decelerating force. All of their arrangements called for engines fitted with steam brakes. When the locomotives slowed down, the cars behind them bunched together, compressing spring-loaded buffers at their ends. In turn, the buffers shoved on levers which actuated the train brakes.

Another brake manufacturer was the Eames Vacuum Brake Company of Boston. In its system a steam-operated "ejector" took the place of a pump and drew air out of a bowl-shaped vessel under each car when a control valve was opened. This caused an India-rubber cover to be driven inward by the greater atmospheric pressure on its outer face, and the motion of the diaphram was transmitted by rods and cams to the brakes. Westinghouse went on to modify his automatic system in a manner which permitted air to be voided to the atmosphere not only through the engineer's control valve but at every triple valve.

The Westinghouse and all other brakes rely on mechanical friction to turn the kinetic energy into heat and thus stop the vehicle or mechanism. All of these brakes involve a brake shoe or friction pads being applied directly to the wheel, brake drum or disc.

Other pertinent brakes which are known in the art are shown in the French patent of Legrande No. 543,694 which discloses a reciprocating fluid damper brake driven by a wheel and having linkage connected to an off center driving pin and U.S. Pat. No. 3,200,906 which discloses a plurality of hydraulic jacks which push a long pressure plate against two flexible strips and four friction plates to provide a plane brake.

With the present energy shortage there is a great need for high speed ground transportation as an attractive alternate to using the already badly overcrowded air-ways, and to induce more people to leave their energy extravagant private vehicles at home. Rather than the 100 MPH speed allowed by present brakes 200–300 MPH trains are now needed.

Besides high-speed passenger service there is a great need to increase the speed of freight trains. The closer the speed of freight trains approaches that of the fastest passenger trains the better, for the more intensively tracks are used, the more economical they are. The faster the speed and the closer to a uniform speed the trains can get, the more journeys each train can make and the more trains can run over one pair of rails. At present all freight trains must significantly decrease speed on downgrades because of the hazard of overheating brakes. If trains can obtain a higher speed, fewer trains and fewer tracks can do more work and reduce capital cost.

At present there is no brake which will completely stop a high speed vehicle and prevent the danger of brake fade. There have been many attempts to invent a successful retarder brake but results have been limited in many respects.

The British new Advanced Passenger Train has four powered axles which use dynamic brakes and six non-powered axles which are fitted with a retarder brake which churns a water-glycol solution and imparts some of the kinetic energy to the water. This system is ineffective at low speed and the train relies on friction brakes to stop it so only 7% of the total braking energy is absorbed by the hydro-kinetic retarder.

Other plans for high speed trains call for electric powered trains with small motors spread along the train adapted to use regenerative or rheostatic braking by reversing the polarity of the motors and thus absorbing the energy of braking. This type of braking is impractical in a country which has large distances to cover such as the U.S.A., Canada, Australia, and most of the areas of the world. The many miles of electric line or third rail and the many power substations which are required make this system economically impractical.

Tentative plans in the U.S. call for high speed rail systems, the most promising of which is the Tracted Air Cushion Vehicle which will travel at speeds of up to 250 MPH. This system will have landing gear with wheels to be braked in order to stop the vehicle. According to the latest report to Congress and the President on the High Speed Transportation Act of 1965, there is not yet a single brake which will take a high speed vehicle from top speed to full stop.

In addition to train brakes other transportation vehicles suffer from brake failure. For example airplane brakes will fail if the reverse thrust of the plane fails to operate. The usual result of this failure is for the plane to run off the runway with the tires burning off, increasing the possibility of the hydraulic fluid catching fire. Large trucks and buses operating in hilly or mountainous terrain often have brake failure from overheating brakes resulting in many lives lost each year.

The present invention generally relates to a friction disc brake which looks much like a conventional disc brake but has the advantage that it also operates in a second mode in which the torque load is shared by a fluid brake mode or the torque load is assumed completely by the fluid brake mode thus relieving the friction mode of any share of the load. This is accomplished by supplying the friction disc with a tilting mechanism and by providing a by-pass hydraulic conduit to allow the hydraulic fluid to circulate from the brake cylinders on one side of the disc past the master cylinder through a cooling circuit, through the opposite brake cylinders and then back to the first cylinder as it is pumped by the reciprocating disc and pistons. A shut-off valve is provided to increase the pressure and to complete the braking in the second mode. Cooling fins or a radiator are utilized to dispel the heat from the friction brake mode and the fluid brake mode.

An alternate brake embodiment relates to a frictionless fluid brake in which braking is accomplished by tilting the disc which converts the rotary motion to reciprocal with the result that the brake cylinders reciprocatively pump the fluid in a circuit through a shut-off valve and a radiator or cooling fins.

In the invention kinetic energy is converted into heat by the shearing of the fluid and the heat is dispelled through the radiator. To completely stop the rotating member from rotating, the shut-off valve is closed completely.

A third cool running brake system can be constructed by circulating the hydraulic fluid of a conventional disc brake through a cooling system. A low efficiency pump such as a centrifugal pump carries the hydraulic fluid through a line which by-passes the master cylinder and pumps it through cooling fins or a radiator while the brakes are in use. The pump can be linked to the rotating member or powered by any type of motor.

The present invention can be easily adapted to be placed on presently operable automobiles, trunks, trains, airplanes, tracted air cushion vehicles and other diverse mechanisms. With the invention's simple sturdy construction, it can be inexpensively adapted to any desired usage. The invention cuts maintenance costs because brake shoe and wheel wear is drastically reduced and gives a quick even stop without lock-up.

The invention is particularly useful in that it provides a safe, dependable brake which is cooler and which will completely eliminate the hazards of brake fade which currently exist with all present commercial brakes.

In the invention, heat is reduced and removed to an area remote to the wheels and tires and is expelled through a radiator.

The benefits that are derived from the use of such novel brakes are that the brake would be the only brake needed at any speed with little or no wear on the wheels or brake blocks of trains. The brake is unaffected by water or the elements, is fail safe, would be safe in an explosive atmosphere and can be remotely controlled by pneumatic, hydraulic, solenoid, or cable means.

SUMMARY OF THE INVENTION

The basic principle of the present brake invention is that it operates in two modes, either in friction mode or selectively simultaneously in the fluid brake mode. If the friction pads fail from brake fade it operates in the fluid brake mode only.

In the friction mode the pistons are extended until the friction pads engage the disc. If a great deal of heat has to be dissipated as for example for a high speed train braking or a huge truck on a steep downgrade, or when a plane's reverse-thrust fails to operate, the rotary motion of the wheel hub, drive shaft or axle is transformed into reciprocal motion by tilting the disc. The tilted disc then begins, by depressing first one and then another of the braking cylinders, to pump fluid through the by-pass circuit with the fluid brake mode sharing the torque load with the friction mode. In this dual mode much of the energy is transformed into heat by the shearing action of the pumping fluid.

If the friction mode fails from overheating, complete braking can still be accomplished simply by increasing the back pressure by closing the shut-off valve in the by-pass circuit, thus halting the reciprocal motion of the pistons and disc which thus halts the rotary motion of the rotating member.

In order to activate the brake the operator depresses a pedal connected to a master cylinder or activates an air booster which extends the piston of the master cylinder applying the friction pads. If the second mode is needed, the operator tilts the disc, which begins to reciprocate and to depress the brake cylinders alternately, pumping fluid through the by-pass circuit with resultant damping action by the fluid or second mode. To completely relieve the friction mode the shut-off valve in the hydraulic by-pass line is closed. If the friction mode fails the fluid brake will absorb all of the torque and the rotating member will cease to rotate. Both modes are cooled by the circulating fluid. Water or a lubricant can be sprayed on the friction pads to completely relieve the friction mode.

In the second design, which does not have a friction mode, the disc is simply tilted and the resultant pumping of the fluid imparts the kinetic energy into the fluid by the shearing action of the fluid with the pressure being increased by adjusting a variable orifice valve as the rotating member slows.

The vehicle or rotating member is brought to a complete halt by closing the shut-off valve completely, thus preventing the rotating member from rotating, locking the wheels or shaft.

The fluid is circulated at all times through cooling fins or a radiator for cooling purposes.

In the third design a conventional disc friction brake is cooled by circulating the hydraulic fluid through cooling fins or a radiator while the brakes are in use. This is accomplished by placing a line in the system which by-passes the master cylinder and circulates the hydraulic fluid from one brake cylinder, or set of cylinders through a cooling circuit, through the opposite brake cylinders and back into the opposite side of the first cylinder. The motion is imparted to the fluid by a low efficiency pump such as a centrifugal pump which is also in the circuit. Regardless of the total braking pressures (they sometimes reach 3000 psi) the fluid will be circulated without restrictions by the pump which will slightly lower the pressure on one side of the pump.

This cooling system will work for a disc brake with two or more braking cylinders and also for a multiple disc brake which has several cylinders in a common housing.

The above mentioned purposes are more readily apparent when read in conjunction with the following detailed description of the preferred embodiment of the present invention.

BRIEF DESCRIPTION OF THE DRAWINGS

FIG. 1 is a schematic view partially in section of the frictionless brake apparatus showing the brake in engagement;

FIG. 2 shows a view of the brake pedal of FIG. 1 and FIG. 4 when the brake pedal is released disengaging the brake;

FIG. 3 shows a front elevational view of the disc of FIG. 4 when the brake pedal is released disengaging the brake;

FIG. 4 is a schematic view partially in section of another embodiment of the invention of FIG. 1 showing the brake in engagement;

FIG. 5 is a schematic view partially in section of a friction-fluid dual-mode brake apparatus showing the brake in engagement;

FIG. 6 is a side perspective view partially in section of the caliper piston holder used in FIG. 5;

FIG. 7 is a schematic view partially in section of another embodiment of the invention shown in FIG. 5 showing the brake in engagement of both friction and fluid modes;

FIG. 8 is a partial frontal view of the disc shown in FIG. 5 when the disc is engaged in friction mode only;

FIG. 9 is a schematic cross sectional view of a master cylinder and associated reservoir which can be used with the embodiment of FIG. 5;

FIG. 10 is a side perspective view of the disc and its associated pistons and friction pads used in FIG. 5 showing both braking modes disengaged;

DETAILED DESCRIPTION OF THE DRAWINGS

Figure 11:
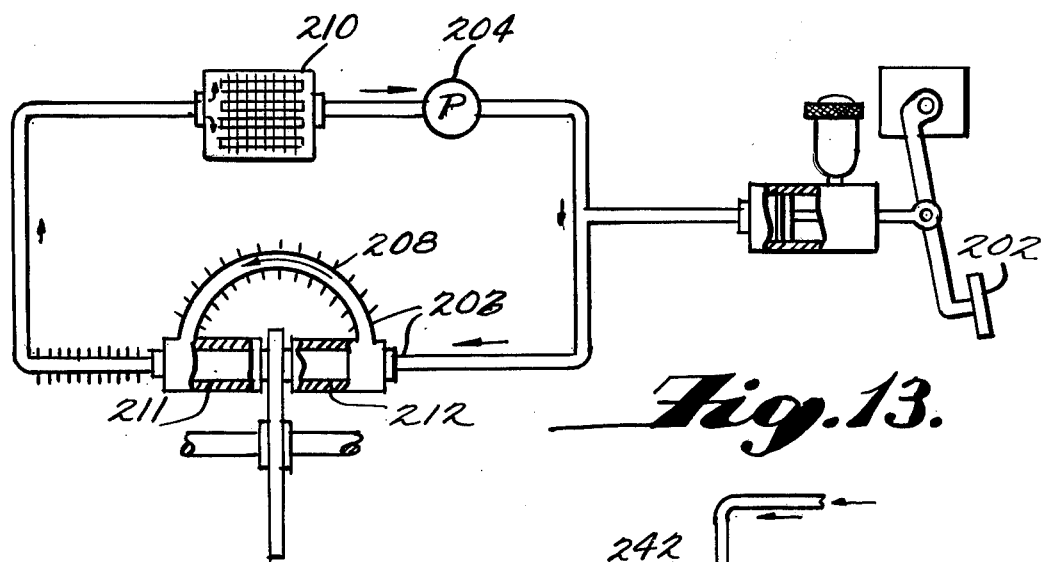
FIG. 11 is a schematic view partially in section of a friction disc brake with cooling system apparatus showing the brake engaged.

The present invention incorporates by reference allowed U.S. application Ser. No. 416,010 filed Nov. 15, 1973 in its entirety.

A solid disc 10 as shown in FIGS. 1, 3 and 5 is movably mounted on an axle, wheel hub, or drive shaft 12. The disc 10 is set at a 90° angle on the drive shaft as shown in FIG. 3 and rotates with the shaft. Surrounding the disc is a caliper 16 as shown by dotted lines in FIGS. 1 and 4 which is constructed so that its top holds or forms a set of opposing hydraulic cylinders 18 and 20 on either side of the disc. Reciprocally mounted in the cylinders are pistons 22 and 24. The brake is engaged by tilting the disc 10 at a slightly obtuse angle on the shaft in the manner of a swash plate after extending the piston heads against disc 10.

The disc is tilted on the shaft by a means of a clutch 14 or other suitable mechanism which is schematically shown in the drawings. The clutch or tilting plate is activated by a mechanical linkage, or a suitable hydraulic or pneumatic cylinder. Methods of tilting a disc such as swash plate are well described in the art or the mechanism described in two of the previously identified patent applications can be used.

The pistons 22 and 24 have smooth slider bearings 26 or can be fitted with one large ball bearing which, when extended, contact and are driven in reciprocating fashion by the rotating, reciprocating disc 10. The caliper bottom 28 surrounds the bottom of the disc as shown in FIG. 4 and is partially filled with oil 30 which lubricates the disc where it contacts the piston heads.

When the brake is engaged as shown in FIG. 4, the pistons 22 and 24 are driven pumping oil through conduits 32 and 33 on the fluid circuit and through two orifices 34 and 36 defined by a single dual orifice valve mechanism 38. Braking is accomplished by closing the orifices 34 and 36 simultaneously through the rotation of the single dual orifice valve 38 by a cable 39 or some other device which is remotely activated by pedal 48 or by pneumatic cylinders 41 which are schematically depicted.

When the brake is disengaged the disc is moved to a 90° angle and the orifices 34 and 36 are opened by rotating or sliding the dual orifice valve 38 and the master cylinder 40 is released so that its large piston 42 retracts to pull the pistons 22 and 24 completely back to their cylinders as shown in FIG. 3. It is to be understood however, that in the embodiment shown in FIG. 1 a single orifice valve 37 is used. At this time, there being no contact between the pistons and the disc, the brake is disengaged. As the piston 42 of the master cylinder 40 retracts it momentarily trips a spring-loaded valve 44 leading to the reservoir 46 which lets in any needed hydraulic fluid and then snaps shut to prevent the cylinder pistons from drifting. This allows the fluid damper brake to be disengaged when not in use.

When the brake is engaged the master cylinder 40 is activated by a foot pedal 48 or an air booster 250 such as that shown in FIG. 5 extending the piston 42 to its full extension expelling the fluid in the master cylinder into the braking circuit. This fluid pressure in the fluid circuit extends the pistons 22 and 24 into contact with the disc 10 which is then tilted and begins reciprocating. When the master cylinder is fully activated to engage the brake the depression of pedal 48 pivots pivot bar 50 around pivot point 52 lifting connecting link 54 which pulls up links 56 and 58 connecting the piston rod 43 to a bracket 60. This extends the links and fully extends the piston 42 in the master cylinder. As the links go slightly past center the piston 42 is locked in place and a stop lug 62 prevents the links from going farther. A biasing spring 64 seats against the cylinder and wall and abuts against the stop lug 63 to force links 56 and 58 out of their extended position into a V shaped configuration so that the pedal 48 returns to its original position once pressure is released from the pedal.

When the master cylinder is locked in place, the pistons pump the fluid through the circulating system, the orifices 34 and 36, and through an efficient radiator 66. The fluid passes by the opening in the line to the master cylinder while the brakes are in use.

The pumping action of the pistons provides most of the needed braking, with the kinetic energy being transferred into heat by the shearing of the fluid. In order to complete braking the variable orifice valve is pushed towards a closed position. When the valve is closed, the rotating axle or shaft will cease to rotate. The heat is removed as fast as it is formed by the radiator system.

FIG. 4 illustrates the hydraulic fluid entering each wheel cylinder 20 by one orifice 70 and leaving by another orifice 72 thus circulating completely and offering the utmost efficiency in cooling.

FIG. 1 illustrates an alternate method of braking with a simplified circulating system, but with the same means of activation of the brakes.

In either of the two designs, shown in FIGS. 1 and 4 the variable orifice valve can be activated by either linking it to the master cylinder activator or the valve can be operated by a separate control 41 as previously discussed.

Two methods can be used for a fail-safe operation. The brake can be air-applied and spring-released with an air reservoir similar to the Westinghouse air brake or it can be spring-applied and air released for a more compact installation which is important where space is scarce such as in a mine railway. For the spring applied system a door-closure type damper would allow the shut-off valves to close slowly, thus preventing sudden lock up. The disc may be reinforced by bracing as is necessary.

The brake can also be constructed with the disc fixed immovably at an obtuse angle and the brake is engaged by simply depressing the master cylinder and extending the piston heads against the reciprocating disc. The fluid immediately starts pumping and the brakes are applied by closing the variable-orifice valves. The dual valve can be linked to the pedal or operated by a separate lever.

The preferred embodiment of the invention is a disc friction brake with fluid damper as is illustrated in FIGS. 5-10. This disc brake 100 is constructed with a disc 102 movably tiltable to an angle slightly obtuse to a drive shaft 104. A pair of hydraulic cylinders 106 and 108 are positioned on opposite sides of the disc 102 and mounted in caliper 116. The hydraulic cylinders are connected by hydraulic lines 110 and 112 to a fluid circuit 114 beginning near the opening of a master cylinder 118. Placed in the circuit is a single double-orifice valve 120 with a single control 122. If desired the circuit can be provided with two separate variable orifice shut off valves. The brake cylinders 106 and 108 are constructed with pistons 124 and 126 having friction pads 128 and 130 secured on the end thereto. The brake cylinders are constructed much like that of a conventional disc brake with the exception that the cylinders are deeper. This allows retraction of the pistons when the brake is disengaged. The friction pads can be pivotable to conform to the angle of the disc.

In operation and upon application of the brake the master cylinder 118 is activated which extends the pistons 124 and 126 with their respective friction pads 128 and 130 into contact with the disc 102 which is at a 90° angle to the axle 104. The pressure on the friction pads 128 and 130 begins to absorb the brake energy. For additional braking the disc 102 is tilted to an angle obtuse from the axle 104. At this time the disc 102 begins to reciprocate and to drive the pistons 124 and 126 in a reciprocating fashion. This pumps the fluid through the small lines 110 and 112 of the damper circuit 114 and absorbs much of the kinetic energy of the circuit. In order to prevent pulsations from the pumping fluid getting back to the master cylinder, a one way spring loaded check valve 132 is set in the feeder line 134 from the cylinder. A by-pass line 136 has a rotary valve 138 which opens when the brake pedal 140 is released and allows the fluid to flow back into the cylinder, thus releasing the brakes. The rotary valve 138 closes when the brake pedal 140 is pressed.

The rotary valve is open or closed through the action of linkage 142 connecting the valve 138 to the brake pedal with its other end secured to a pivot bar 146 pivotable around pivot point 148 which may be a pin, shaft or other suitable member. A pivot bar connecting member 150 is pivotably mounted to the other end of pivot bar 146 and is pivotably mounted to one end of a second pivot bar 152 pivotally mounted at pivot point 154 in the same manner as the first pivot bar. A connecting link 156 is pivotably mounted to the other end of the second pivot bar 152 and is connected to one end of a valve activator handle 158 which opens or closes the valve 138 depending upon the position of the brake pedal 140.

Figure 13:
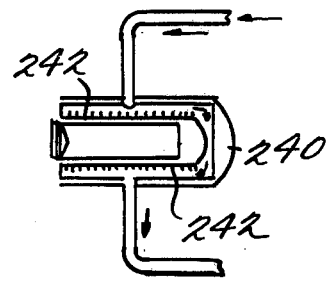
FIG. 13 is an enlarged cross sectional view of an alternate embodiment of pistons which can be used in the embodiments of FIGS. 11 and 12.

An alternate construction for the brake cylinders is shown in FIG. 13.

The cylinder as shown has a cooling jacket 240 around it and is finned at 242 to dispell heat into the hydraulic fluid as it is pumped through. The cylinder is valved the same as is shown in the non-jacketed illustrations.

If additional braking is needed such as when the friction pads 128 and 130 are overheated with resultant brake fade, the variable orifice valve 120 is closed completely. Once the variable orifice valve is closed this will stop rotation of the disc 102 completely regardless of whether the friction pads are functioning or not. When the master cylinder is released, the pistons are retracted so that they do not contact the disc.

FIG. 7 illustrates the same concept as previously described with a simpler hydraulic circuit 160 which will be sufficient for most applications. Two methods can be used for fail safe operation. The brake can be air applied and spring released with an air reservoir, like the Westinghouse air brake, or it can be spring applied and the air released for a more compact installation. The latter is more important where space is scarce such as that on a mine or railway car.

Figure 12:
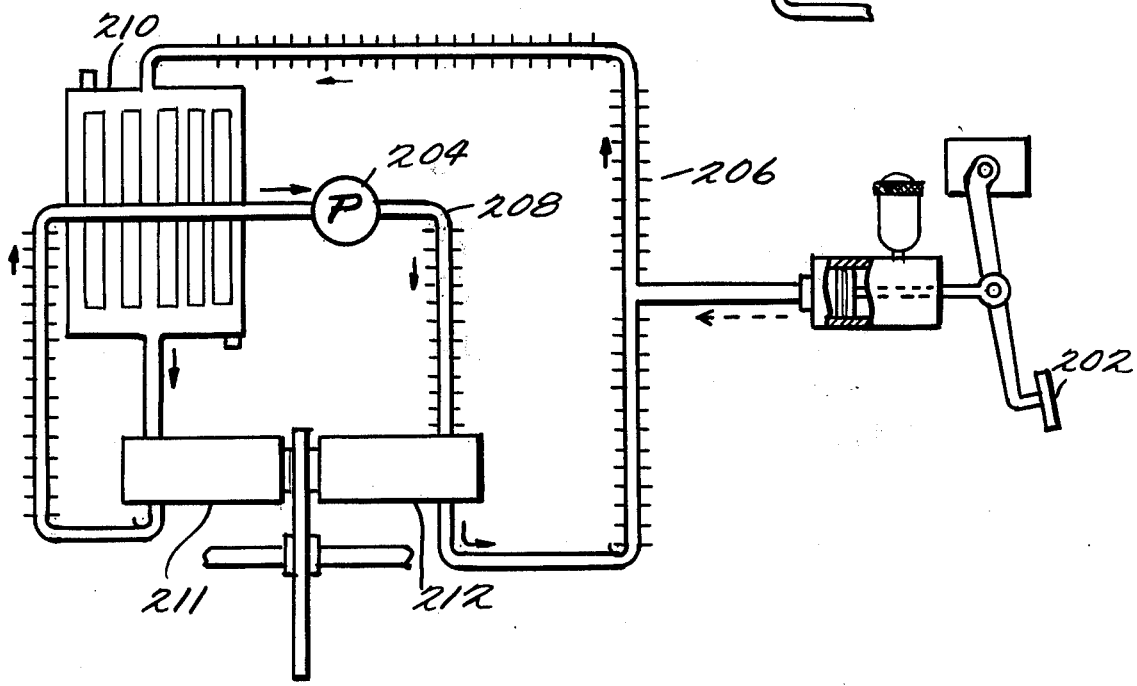
FIG. 12 is a schematic view partially in section of another preferred embodiment of the invention shown in FIG. 11.

Another brake system is disclosed in FIGS. 11 and 12. While the braking pressure is being exerted on the master cylinder of a friction disc brake, through the brake lever and pedal 202, a low pressure pump 204 which is preferably a centrifuge pump, although other pumps may suffice, pumps the fluid through a by-pass circuit 208 which is cooled by fins 206 or alternately a radiator 210. The cylinders 211 and 212 through which the fluid flows are preferably connected in series in by-pass circuit 208 and are provided with pistons hollow on the fluid side and strengthened by a latticework of cooling fins on one side of the inside of the pistons (not shown) to pump the fluid each time the brakes are pumped. Regardless of the amount of pressure from the master cylinder, the low efficiency pump will lower the pressure slightly on one side and increase it slightly on the other side of the pump causing the fluid to circulate completely. The pump is connected in series in said by-pass circuit with said cylinders and can be continously driven by any type of a motor or it can be linked to the rotating member clutchable to only operate while the brakes are being used.

The centrifugal pump would receive the fluid through an axial tube and an impeller would whirl the fluid and expell it through its volute with a very low pressure. Any of the several types of low efficiency pumps can be used.

The pressure from the master cylinder being greater than the pressure of this type of pump can get by the pump and exert the desired braking pressure on the brake cylinders. Since there is no restrictions as to the flow of the fluid through the cooling circuit, the fluid will continue to circulate regardless of the amount of pressure from the master cylinder. The flowing of fluid will not interfere with the function of the brake cylinder and neither will the pressure interfere with the circulation of the fluid. This cooling of the fluid would prevent brake fade in airplanes, trucks, cars and trains. For large planes with multiple disc brakes and multiple brake cylinders the construction would be much the same. In this type of brake all of the braking cylinders are on the same side of the discs and have a common housing. The fluid would enter the inlet port as at present but would exit through an outlet port on the opposite side and circulate as illustrated and described. This would in no way interfere with the operating pressures of the brake.

An alternate construction for the brake cylinders is shown in FIG. 13.

The cylinder as shown has a cooling jacket 240 around it and is finned at 242 to dispell heat into the hydraulic fluid as it is pumped through.

While the preferred embodiment of the invention has been disclosed, it is understood that the invention is not limited to such an embodiment since it may be otherwise embodied in the scope of the appended claims.

What is claimed is:

1. A friction disc brake apparatus comprising in combination a rotating member, a disc immovably mounted on said rotating member, said disc being adapted to rotate when said member rotates, a plurality of piston-cylinder means opposite each other on opposite sides of said disc, a friction pad fixed to the end of each of said pistons, fluid circuit means interconnecting said piston-cylinder means series with each other and a master cylinder, heat radiation means mounted in series with said circuit means, a pump mounted in series with said fluid circuit means external to said rotating member adapted to continuously pump fluid through said unit and heat radiation means thereby cooling the fluid contained within said circuit means, and brake pedal means connected to a piston mounted in said master cylinder adapted to expell fluid from said master cylinder into said fluid circuit causing the friction pads of the pistons to engage said disc.

2. A friction disc brake apparatus as claimed in claim 1 wherein said pump is a low efficiency pump which will lower the pressure on one side and increase it slightly on the other side causing fluid to circulate through the circuit.

3. A friction disc brake apparatus as claimed in claim 2 wherein said pump is a centrifugal pump.

* * * * *